United States Patent [19]
Kattan et al.

[11] 3,979,175
[45] Sept. 7, 1976

[54] VAPOR RECOVERY AND DISPOSAL SYSTEM

[75] Inventors: Abraham Kattan, North Miami Beach, Fla.; John E. Gwyn, Pasadena, Tex.

[73] Assignee: Shell Oil Company, Houston, Tex.

[22] Filed: Feb. 24, 1975

[21] Appl. No.: 552,573

Related U.S. Application Data

[63] Continuation-in-part of Ser. No. 401,514, Sept. 27, 1973, Pat. No. 3,897,193.

[52] U.S. Cl. ............................... 431/5; 23/277 C; 220/85 VR; 431/202
[51] Int. Cl.[2] ........................................ F23G 7/06
[58] Field of Search .............. 431/5, 202; 23/277 C; 141/45; 220/85 VR

[56] References Cited
UNITED STATES PATENTS 3,776,283  12/1973  Kramer et al. ..................... 141/45
3,817,687  6/1974  Cavallero et al. .................... 431/202

*Primary Examiner*—Edward G. Favors
*Attorney, Agent, or Firm*—Ronald R. Reper

[57] ABSTRACT

A system is disclosed for preventing gasoline vapors contained in air vented from gasoline storage tanks from entering the atmosphere, which includes a conduit to pass gasoline vapor-laden air to a bed of adsorbent for gasoline and, when the adsorbent approaches saturation, subjecting it to back-flushing, with or without heat, to an extent and for a time adequate to remove enough gasoline from the adsorbent to restore it to a regenerated condition, and incinerating the gasoline removed from the adsorbent bed.

4 Claims, 2 Drawing Figures

VAPOR RECOVERY AND DISPOSAL SYSTEM

This application is a continuation-in-part of my copending application Ser. No. 401,514 filed Sept. 27, 1973 and now U.S. Pat. No. 3,897,193.

BACKGROUND OF THE INVENTION

A source of air pollution is the gasoline vapor in air vented from storage tanks for gasoline when those tanks are filled. Storage tanks, such as the underground storage tanks in filling stations and the fuel tanks in automobiles, draw air in as the volume of liquid is gradually depleted. Long contact with the liquid causes the air in the tank to become saturated with, or at least very enriched with, gasoline vapors. When liquid is added to the tank to replenish the supply, a volume of gasoline vapor-rich air essentially equal to the volume of liquid added is displaced and vented to the atmosphere unless some means for removing the gasoline vapor from the air is employed.

THE INVENTION

The present invention provides an effective and inexpensive system to avoid gasoline vapor loss to the atmosphere when storage tanks for gasoline are filled. The invention is a system to recover and dispose of gasoline from vapor-laden air that is vented from a gasoline storage tank while said tank is being filled, comprising: means for collecting vapor-laden air from said storage tank, at least one vessel containing a bed of solid adsorbent capable of selectively adsorbing gasoline from said vapor-laden air, a vent to the atmosphere from said vessel, a valved inlet into said vessel on the other side of said bed from said vent, said inlet connected to said means for collecting vapor-laden air, a valved conduit from said vessel connecting the inlet side of said bed to the inlet of a furnace, means for drawing backwash air through said bed and discharging it in said furnace, means for igniting solid said gasoline-containing backwash air in said furnace, and means for stopping said discharge of backwash air to the furnace when combustion is concluded. The invention further provides a process for recovering and disposing of gasoline vapor from vapor-laden air expelled from a tank while filling it with gasoline, comprising: collecting said vapors, passing at least some of said vapors through a bed of solid adsorbent capable of selectively adsorbing gasoline from the vapor-laden air, passing air substantially free of gasoline vapors from the other side of said bed of adsorbent to the atmosphere, maintaining a volume of gasoline vapor-rich air, stopping the flow of vapor-laden air through said bed before said adsorbent becomes saturated with gasoline, subsequently backwashing said bed with a backwash air for a period long enough to desorb enough gasoline to regenerate said bed, passing the gasoline-containing backwash air to a furnace wherein the gasoline contained in said backwash air is burned, and, extinguishing the furnace flame and stopping backwash flow when said backwash air contains insufficient gasoline to support combustion.

Within the broad scope of this invention, there are many preferred embodiments and operating procedures. One preferred embodiment is to employ a system wherein vapor volumes are exchanged between various vessels so that only excesses need be passed through the adsorbent bed, whereby the capacity of the adsorbent bed and the accompanying system can be greatly diminished; or, alternatively, the time between regenerations may be greatly extended. For example, when a filling station storage tank is to be filled from the tank of a delivery truck, the volume of liquid added to the storage tank is substantially the same as the volume of liquid removed from the truck. Consequently the amount of vapor-laden air vented from the storage tank will be substantially the same as the volume of air vented into the tank of the delivery truck. In a preferred embodiment of this invention, during loading of the storage tank, the vapor spaces of the tank on the truck and the storage tank will be connected, and both will be connected either directly or indirectly to the adsorbent bed or to a storage vessel for gasoline vapor-rich air. In such a system only the difference in gas volume caused by factors such as temperature or pressure differences between the two vapor spaces will be passed through the adsorbent bed or to the volume for storing saturated or vapor-rich air, thereby greatly diminishing the volume of gasoline-laden air that must be treated by the adsorbent bed or that must be stored in the storage vessel for vapor-rich air.

A slightly modified version of the same technique may be used to exchange vapor volumes between a filling station storage tank and the fuel tank of a vehicle. In such a system the vapor volume exchange will be effected by connecting the vapor space of the vehicle fuel tank and the vapor space of the storage tank during the period when fuel is removed from the storage tank and added to the vehicle tank if the systems are sufficiently sealed so that these volumes may be exchanged without the addition of outside air. Again, in such a system a substantially equal volume of vapor is exchanged and only the slight volume difference, due to factors such as thermal expansion or small pressure variations, will pass through the adsorbent bed or to a vessel for storing vapor-rich air. The above-described volume exchange systems relate to ideal systems where the various vessels and the conduits interconnecting them are completley enclosed, and such systems are referred to hereinafter as closed systems.

When systems are used in which outside air enters the various flow streams, this invention is still effective although it may be necessary to accommodate to a greater volume of air. Systems in which small amounts of air are induced into the various flow streams, for example by the Venturi effect of a liquid stream passing through a nozzle where a completely tight connection is not made, may also be employed with this invention. Such systems are referred to hereinafter as tight systems. In tight systems equal or substantially equal volume exchanges of air between storage tanks will never be made because some volume of air will always be added to the gas volumes being exchanged. In tight systems the adsorbent beds will generally have to deal with the signficant volume of gasoline vapor-laden air, and greater amounts of adsorbent, more frequent regeneration or more thorough regeneration of the adsorbent will be necessary. In adapting this invention to a tight system, the vapor spaces of the various vessels may be interconnected but conduits must be made available to carry excess vapor to the adsorption bed.

The present invention is also useful in systems in which large amounts of air are forced into the various streams. These systems are hereinafter referred to as open systems. An example of an open system is one in which the gasoline vapor-laden air escaping from a fuel tank as it is being filled is prevented from escaping to the atmosphere by being induced into a collection system. For example, the nozzle for filling a vehicle fuel tank may be provided with a hood that has a partial vacuum induced by a blower connected to it so that all of the air vented from the fuel tank, as well as some extraneous air, will pass into the vapor recovery system thereby preventing gasoline vapors from entering the atmosphere. In such systems the air drawn into the system may constitute more than 90% of the gas phase to be dealt with; and, accordingly, substantially larger amounts of adsorbent or more frequent regeneration intervals will be needed.

Whether the system for collecting vapors is open, tight or closed, or whether the system involves volume exchange or not, eventually at least some gasoline vapor-laden air to be vented passes through the bed of adsorbent wherein substantially all of the gasoline is removed from it, and air substantially free of gasoline is passed to the atmosphere. Before the adsorbent is saturated and before a significant amount of gasoline vapor breaks through the bed, the adsorbent must be regenerated. Most adsorbents use only a small percentage of their total capacity when employed in the present invention. For example, if an adsorbent is used until it is completely saturated, too much gasoline vapor will break through the bed and enter the atmosphere. On the other hand, completely regenerating the adsorbent so that all gasoline is gone from it is a very difficult and costly process and one that will not normally be done. The adsorbent beds employed in this invention will normally operate over that portion of their capacity between the point where gasoline vapors break through the bed and the point of desorption that can be achieved by simple backwashing of the bed with air, with or without the application of a moderate amount of heat.

In accordance with the invention, regeneration is effected by backwashing the adsorbent bed with a readily available gas such as air to remove gasoline from the adsorbent bed by vaporizing it into the backwash gas. The vapor-containing backwash gas is then passed to a suitable furnace where it is incinerated whereby the gasoline contained therein is converted essentially to innocuous carbon dioxide and water. The backwashing is continued for a time sufficient to produce a regenerated adsorbent, that is, an adsorbent that is capable of adsorbing additional gasoline vapors when vapor-laden air is passed through it again in the adsorption mode. It is within the scope of this invention to provide heat to the adsorbent bed to aid in the regenerating process. The heat may be in the form of electric heating elements, steam or hot water coils or in the form of hot air obtained by passing the backwash gas through a heat exchanger.

It is evident that to incinerate the backwash gas without the use of catalysts or expensive combustion techniques, it will be necessary that the backwash gas contain enough gasoline to be a combustible mixture. In one embodiment of the present invention, backwashing of the adsorbent bed to effect a greater degree of regeneration can be accomplished as well as extending the period between regeneration cycles when some vapor-rich air is separately collected and stored. In the normal operaton of a filling station, it is relatively easy to effect delivery of gasoline from a tank truck to the underground storage tank of the filling station in a closed or a tight system. In such closed or tight systems all of the air exchanged between vessels is saturated with, or at least very enriched in, gasoline vapors. The vapor-rich air may be only partially passed to the tank truck from the underground storage tank and some portion of it may be stored in a separate vessel for later combustion. As an alternative a separate vessel may be provided with air and a small volume of liquid gasoline so that saturated air is available. Another alternative is to collect air expelled from a tank while refueling a vehicle in a tight system and to enrich the excess air in gasoline vapors before passing it to storage. When such a vessel containing gasoline vapor-rich air is available, the regeneration of the adsorbent can be carried to a much greater degree.

When regeneration of the adsorbent bed is begun, the backwashing air will contain sufficient gasoline vapor to support combustion. However, as the regeneration proceeds the backwash gas will contain lower and lower concentrations of gasoline vapor and ultimately it will reach the point where it will no longer support combustion. At that point, regeneration of the adsorbent bed would have to cease because continued regeneration would simply put gasoline vapors into the atmosphere.

In accordance with one embodiment of the invention, when the backwash gas produced in regenerating an adsorbent bed does not contain enough gasoline to support combustion, gasoline-rich air will be provided from the separate storage vessel to provide the additional fuel required for the backwash gas to support combustion. Thus, by separately collecting vapor-rich air it is possible to carry the regeneration of the adsorbent bed to a much greater degree, thereby greatly increasing the period between regeneration cycles and additionally avoiding altogether the requirement to adsorb gasoline vapors from the separately collected vapor-rich air.

The system of this invention must be operative at all times when liquid is being transferred from one storage tank to another. In this invention a single bed of adsorbent may be used because regeneration may be effected simultaneously with collecting vapor-laden air. If regeneration is in progress and air is backwashing the adsorbent bed, a surge of vapors resulting from moving fuel from one tank to another may flow directly to the furnace and be incinerated, or if it is too voluminous for the furnace, it may reverse the flow through the adsorbent bed temporarily so that gasoline is removed from the surge of vapor-laden air and deposited in the absorbent bed; and after the surge passes the flow through, the adsorbent bed again reverses and the bed is backwashed with air again. In one embodiment, two adsorbent beds are employed, and one adsorbs gasoline vapors while the other is being regenerated.

The regeneration of an adsorbent bed usually will be accomplished very quickly compared to the time it spends adsorbing vapors. Regeneration can be terminated automatically by stopping the backwashing of the adsorbent bed when the flame in the incinerator can no longer be maintained due to lack of fuel. Thus, when all vapor-rich air has been exhausted and the adsorbent bed has been backwashed to the point where a combustible mixture of backwash gas can no longer be maintained, relatively simple automatic equipment may be employed to terminate the regeneration period. When measures are taken to insure a sufficient amount of gasoline vapor-rich air to complete the regeneration, regeneration may be terminated automatically after a predetermined time period has elapsed. By regulating the time of the adsorption cycle by such factors as the volume of gas treated and by regulating the time of the regeneration cycle by such factors as the absence of a combustible mixture or the elapse of the predetermined time, sophisticated instruments for sensing hydrocarbons in flowing streams may be avoided.

BRIEF DESCRIPTION OF DRAWINGS

FIG. 1 is a highly schematic representation of a system embodying this invention, and it is provided to show the various functions that will be employed without regard to scale. The line 1 in the drawing represents grade below which is buried a filling station storage tank 2. There is also illustrated a tank delivery truck 3 provided with a liquid delivery hose 5 for delivering liquid gasoline through a suitable conduit 6 to join the volume of gasoline 7 maintained in the tank 2. There is also illustrated a conduit 8 for delivering gasoline through a pump 10 and a filling station island 11 for delivery through a hose 12 to an automobile or other vehicle 13. The equipment thus far described is the conventional equipment that already exists in virtually every filling station or is periodically associated with every filling station.

Figure 1:
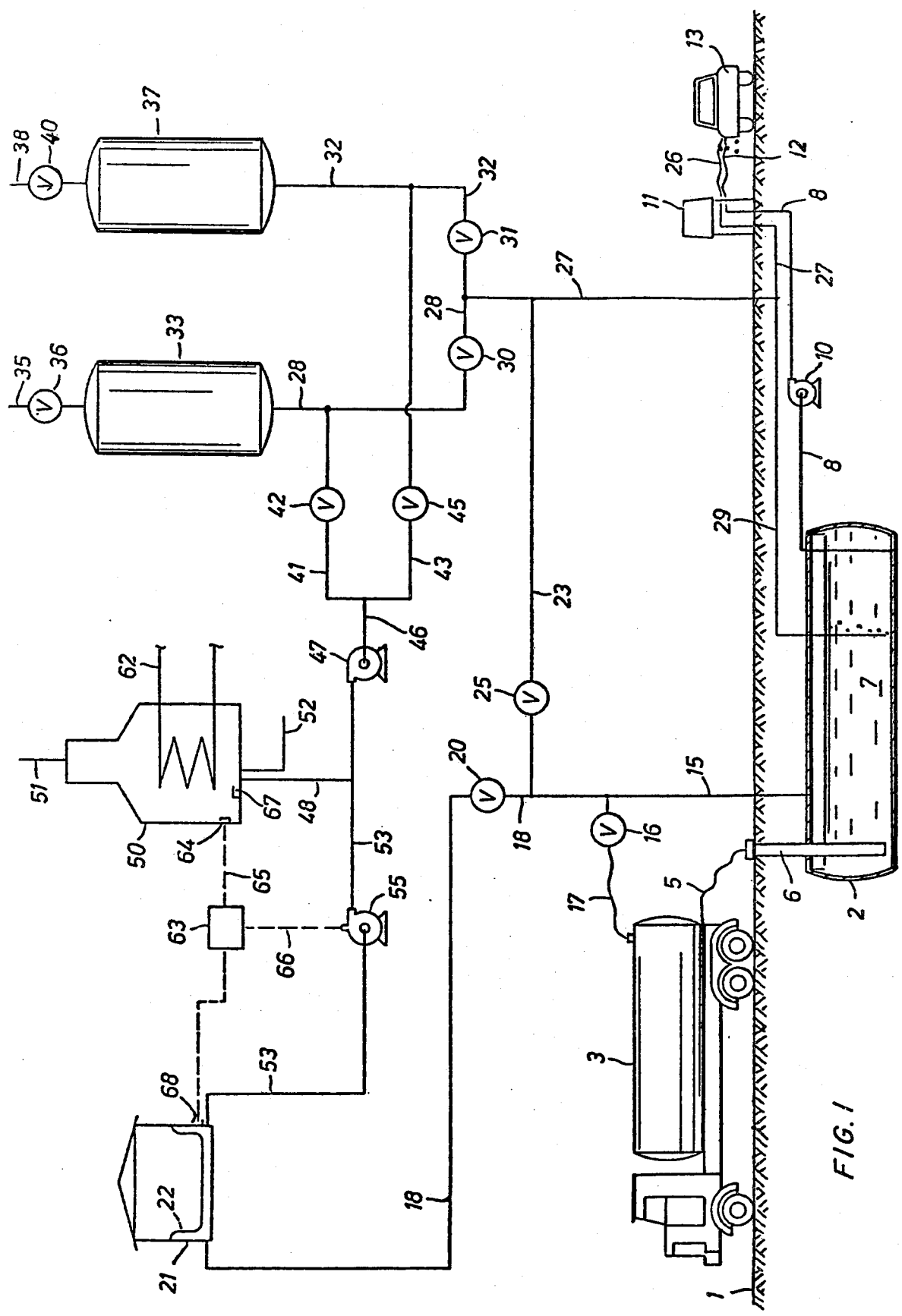
FIG. 1 is a schematic of the preferred form of the invention.

In accordance with the present invention, the vapor space in the storage tank 2 may be connected via pipe 15, valve 16 and conduit 17 to the vapor space in the tank on delivery truck 3. Accordingly, when liquid is delivered from delivery truck 3 to storage tank 2, if valve 16 is open the vapor-laden air in the vapor space of vessel 2 passes through line 15 and is drawn into the tank of truck 3 via line 17 as the level of liquid in the tank of the truck 3 diminishes. Any excess vapor-laden air from the vapor space of tank 2 passes on through line 15 to one or another of the vapor recovery systems to be described hereinafter. The lines 5, 15 and 17 constitute a closed or a tight system, and the vapor-laden air passing through line 15 will be substantially saturated with gasoline vapors.

When the volume exchange system is not employed, valve 16 may be closed and the vapor-laden air from tank 2 may be passed through two alternative routes. The first route is through line 18 and valve 20 when valve 20 is open which causes the vapor-rich air to pass into storage vessel 21 illustrated with a flexible diaphragm 22 that is capable of expanding the volume of vapor-laden air within the vessel 21 without loss to the atmosphere. The vapor-rich air in vessel 21 will be disposed of as explained in more detail hereinafter.

Still another alternative route for the material flowing through line 15 is through line 23 and valve 25. When valve 25 is open, the vapor-laden air passing through line 23 has the vapor removed therefrom as will be described in more detail hereinafter.

When filling a vehicle fuel tank, a means will be provided for collecting the vapor-laden air expelled from the vehicle storage tank, which means is not shown herein, and the collected vapor-laden air is passed through flexible hose 26 and into line 27. The material in line 27 can be passed through one of several alternative routes. If a closed system or a tight system exists between tank 2 aand vehicle 13, the vapor-laden air is passed through line 27 and line 29 and is introduced beneath the surface of the gasoline in tank 2. This volume exchange provides for vapor-rich air to enter tank 2 rather than ordinary air, and it thereby avoids gasoline losses by introducing most of the air vented from the vehicle tank into the underground storage tank. The vapor-laden air introduced into tank 2 through line 29 is saturated as it bubbles through the gasoline to avoid formation of explosive mixtures in tank 2 and disposed of via line 15. Alternative methods for saturating this vapor-laden air may be employed.

If an open system exists betwen vehicle 13 and line 27, it will not be economical to use line 29 and volume exchange because too much gasoline would be consumed saturating the excessive amounts of air drawn from the fuel tank of vehicle 13; thus, the excess vapor laden air is passed through line 27 and then either through line 28 to the adsorbent bed in vessel 33 or through line 32 and the adsorbent bed in vessel 37. Valves 30 and 31 will be opened and closed appropriately so that one or the other of vessels 33 and 37 will be in use. In passing through the bed of adsorbent, the gasoline vapors are removed from the air, and vapor-free air passed through the vent to the atmosphere. When the vessel 33 is in the adsorption mode, valve 31 in line 32 will be closed to prevent the flow of vapor-laden air therethrough. However, when the adsorbent bed in vessel 33 becomes sufficiently saturated with gasoline to be regenerated, the valve 30 will be closed and the valve 31 will be opened so that vapor-laden air may pass through line 32 and into vessel 37 which also contains a bed of adsorbent for gasoline vapors. The resultant gasoline-free air is vented through vent 38 and valve 40 to the atmosphere. When desired, the vapor-saturated air passing through line 15 and line 23 may also be passed to one or the other of the adsorbent beds contained in vessel 33 or 37.

For the sake of illustration, it will be presumed that the adsorbent bed in vessel 33 is in the adsorption mode and the adsorbent bed in vessel 37 has been regenerated. When sufficient gasoline has been adsorbed in the bed in vessel 33 so that regeneration of that bed is appropriate, valve 30 will be closed and valve 31 will be opened. At that point valve 42 in line 41 will be opened and the blower 47 will be placed in operation so that a flow of air passes through line 35 to backwash the adsorbent bed in vessel 33 with air, through line 28 and line 41 into line 46, through blower 47 and ultimately into line 48 which discharges into the furnace 50. In the furnace 50 sufficient air added through line 52, and perhaps catalyst, is employed so that the gasoline in the air entering the line 48 is burned to essentially innocuous material such as carbon dioxide and water vapor which are vented through the line 51.

When the adsorbent in vessel 37 approaches saturation, regeneration in that vessel is effected by closing valve 31 and 42 while valve 30 and 45 are opened so that air backwashes the bed in vessel 37, desorbing the gasoline from the bed and regenerating it. The backwash air passes through line 32, line 43 and line 46, through the blower 47 and the before-mentioned line 48 so that the gasoline vapors are disposed of in furnace 50.

It is evident that either all or part of the vapor-rich air expelled from storage tank 2 when it is being loaded may be passed into the adsorbent bed in vessel 33 or vessel 37 when a separate vessel for saturated vapors is not employed. In one embodiment of this invention a volume of vapor-rich or saturated air is stored in a storage tank 21 in order to effect more complete regeneration of the adsorbent in vessels 33 and 37. The use of the vapor-rich air for this purpose is as follows.

When regenerating the adsorbent bed, for example the bed in vessel 37, air is drawn into the bed through line 38 to backwash the bed and desorb gasoline vapors which are passed ultimately to the furnace 50. When regeneration is begun, a high concentration of gasoline vapors is in the backwash air and combustion of this stream offers no difficulty. However, as the regeneration proceeds the concentration of gasoline in the backwash air becomes smaller and smaller until ultimately the mixture entering furnace 50 through line 48 does not contain enough gasoline to support combustion. At this point the regeneration of the adsorbent in vessel 37 must stop whether a sufficient amount of gasoline has been desorbed or not. In accordance with this embodiment of the invention, when the gasoline contained in the backwash air is not sufficient to maintain combustion, the blower 55 is turned on so that gasoline-saturated air passes from container 21 through line 53 to join the air-gasoline mixture in line 48. Since the air passing through line 53 is saturated or very enriched with gasoline vapors, it increases the concentration of gasoline in the combined stream in line 48 to the extent that combustion may be effected. Thus, the backwashing of the adsorbent in bed 37 may be continued long after the amount of gasoline desorbed from that bed is sufficient to support combustion. This embodiment of the invention may increase the capacity of the adsorbent bed in vessel 37 between successive regenerations.

It is also an embodiment within the scope of this invention to operate the furnace when storage tank 2 is being filled to dispose of some of the vapor issuing from it while the rest is taken care of in one or the other of the adsorbent beds in vessels 33 and 37. In this embodiment, during the loading of the storage tank 2 the vapor expelled from it passed through line 15, line 23, line 27 and one or the other of the lines leading to vessel 33 or 37. For purposes of illustration, vessel 33 will be employed to adsorb the excess vapors. In this embodiment the valve 42 is opened and the blower 47 is operated. In this embodiment the vapor-saturated air is drawn through the blower 47 and discharged into the furnace 50 to be disposed of by combustion. Any excess vapor-laden air that is beyond the capacity of the blower 47 to handle simply passes through line 28 into the vessel 33 wherein the gasoline is removed from the air and pollutant-free air is discharged through the vent 35. The blower 47 may be turned off when storage tank 2 is filled, or it may remain in operation until the adsorbent in vessel 33 is regenerated as indicated by insufficient gasoline in the vapor--air mixture passing through line 48 to support combustion.

Finally, the gasoline disposed of in the furnace 50 need not be wasted. A coil, schematically represented as 62, may be employed to heat water, to generate steam, or even to provide hot air which may be employed in internal coils in the vessels 33 and 37 to aid in the regeneration of the adsorbent contained therein.

One suitable control for regeneration includes a control center 63 having suitable conventional means to receive impulses characteristic of specific conditions and to produce a suitable control impulse in response thereto. As shown herein, the control center 63 is connected via line 65 to a suitable sensing means 64 that is capable of sensing a flame or of measuring a high temperature. When a flame from burning the gas entering the furnace 50 via line 48 exists, the control center 63 will maintain blower 55 inoperative via line 66.

When the flame is extinguished, however, blower 55 is turned on and vapor-saturated air is introduced through line 53 into line 48. Igniter 67 will then cause the mixture from line 48 to burn until the volume of vapor-rich gas in vessel 21 is exhausted, as indicated by sensor 68, at which time control 63 will turn off blower 55 as well as blower 47 by conventional means not shown. It is evident that many conventional control circuits may be employed to introduce vapor-rich air when backwash gas will no longer support combustion and to discontinue operation of all blowers when all combinations of backwash gas and vapor-rich air that will support combustion have been exhausted.

Figure 2:
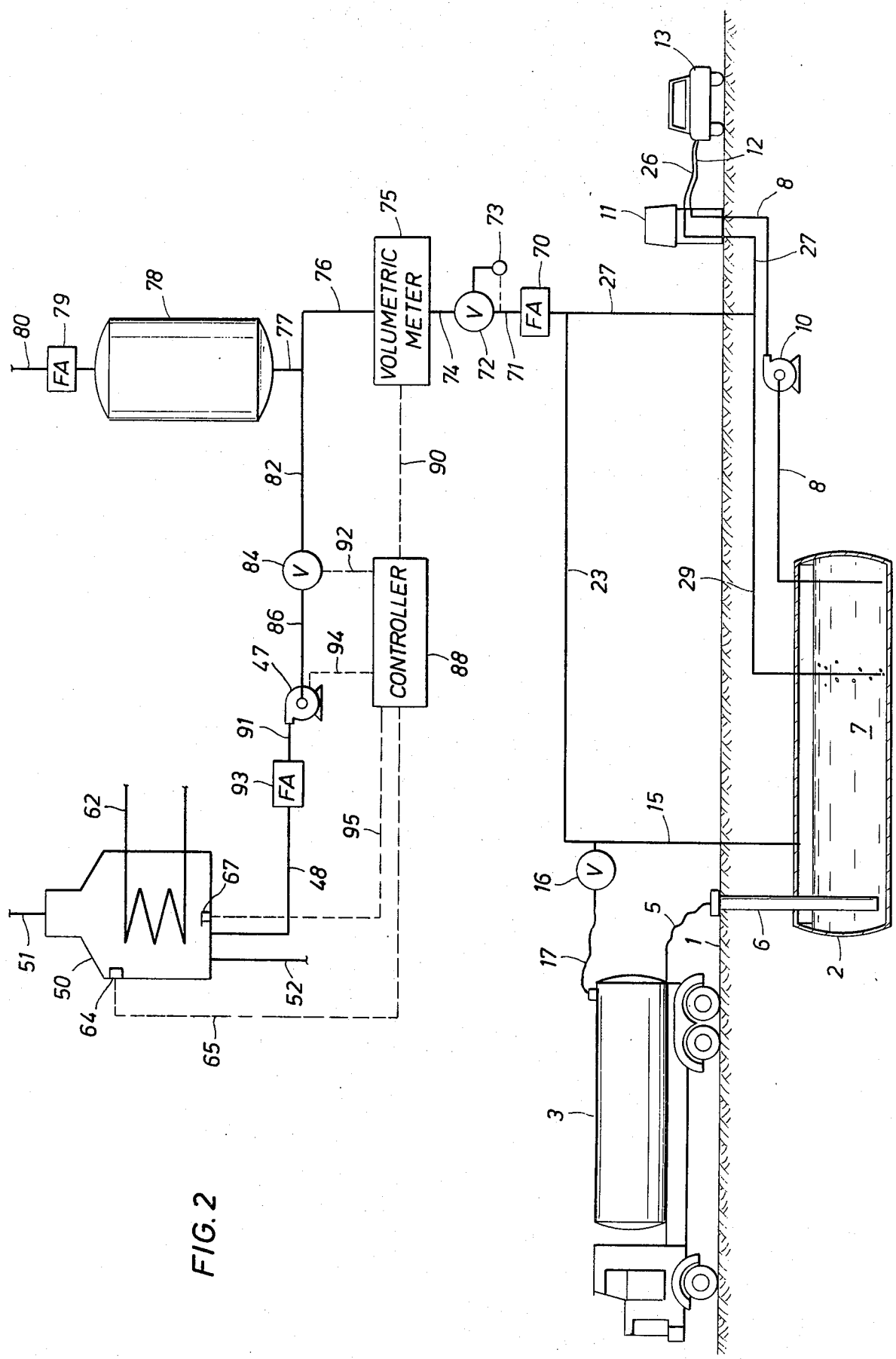
FIG. 2 is a modification of the form shown in FIG. 1.

FIG. 2, in which the numerals have the same meaning as described for FIG. 1, is a highly schematic representation of another system embodying the invention, again without regard to scale. Material in line 27 is passed through optional flame arrestor 70 and line 71. Upon the sensing of a gasoline vapor e.g. by a slight predetermined amount of pressure in line 71, gasoline vapor sensing device 73, which may be a pressure sensing device causes normally closed valve 72 to open thereby allowing passage of the vapors via line 74, volume measuring means 75, line 76 and 77 to the adsorbent bed in vessel 78. Valve 84 in line 82 will be closed to prevent flow of vapor-laden air therethrough. Upon passing through the bed of adsorbent, the gasoline vapors are removed from the air and the vapor-free air passes through optional flame arrestor 79 and vent line 80 to the atmosphere. When sufficient volume of vapors have passed through the volume measuring means (preferably an amount corresponding to about the maximum adsorption capacity of the adsorption bed without any gasoline vapor being vented) an impulse from said means via line 90 to control center 88 initiates a regeneration cycle whereby valve 84, connected to the center via line 92 is opened and blower 47, connected via line 94, is turned on. Air is drawn via vent line 80 into the bed in vessel 78 to backwash the bed and desorb gasoline vapors which are ultimately passed to furnace 50 via lines 77, 82, valve 84 line 86, blower 47, line 91, optional flame arrestor 93 and line 48. Ignition means 67 which may be e.g. a pilot light or an electrical igniter operatively connected to the control center 88 via line 95 to function so long as blower 47 is in operation, will then cause the mixture from line 48 to burn until there is insufficient gasoline to support combustion. As has been said valve 72 will normally be closed, during regeneration. However, during the loading of the storage tank 2, the vapor expelled from it passes through lines 15, 23, 27 and 71 and sensing device 73 will maintain valve 72 open thereby passing the vapors on to furnace 50 for combustion without the need for intermediate adsorption. This ability to pass the vapors directly to the furnace is beneficial in reducing the size of the adsorption bed required for a peak vapor load, especially when the vapor collection system is arranged to collect vapors from two or more tanks being filled simultaneously. A flame or temperature sensing device 64 in furnace 50 is connected to control center 88 via line 65. After the appropriate control has been activated by sensing a flame in the furnace, loss of flame or temperature, as desired, will cause the control center to close valve 84, maintain blower 47 inoperative and automatically return said control center to the adsorption mode. By this procedure should an inadvertant flame out of the furnace occur, little, if any, uncombusted vapor could be vented to the atmosphere.

The solid adsorbents useful for use in this invention may be any of those known to the art which are capable of adsorbing gasoline vapors from a mixture of gasoline vapors and air. Examples of suitable adsorbents are activated carbon such as charcoal, silica gel and certain forms of porous minerals such as alumina, magnesia, etc. which are known to selectively adsorb gasoline vapors from air.

What is claimed is:

1. A system to recover and dispose of gasoline from gasoline vapor-laden air that is vented from a gasoline storage tank while said tank is being filled, comprising:
    A. means for collecting vapor-laden air from said storage tank,
    B. at least one vessel containing a bed of solid adsorbent capable of selectively adsorbing gasoline from said vapor-laden air,
    C. a vent to the atmosphere from said vessel,
    D. a valved inlet into said vessel on the other side of said bed from said vent, said inlet connected to said means for collecting vapor-laden air,
    E. a valved conduit from said vessel connecting the inlet side of said bed to the inlet of a furnace,
    F. means for measuring the volume of vapor-laden air passing through the valved inlet into the vessel,
    G. means for drawing backwash air through said bed for desorbing gasoline therefrom and discharging said gasoline-containing air in said furnace,
    H. means of igniting said desorbed gasoline in said furnace,
    I. control means operatively connected to said volume measuring means, to means for drawing backwash air and to means for igniting, for activating said means for drawing backwash air and means for igniting, upon passing of a predetermined volume of vapors through said volume measuring means, and
    J. means for stopping said discharge of backwash air to the furnace when combustion of the gasoline is concluded.

2. A system as in claim 1 wherein the valve in the valved inlet into said vessel is normally closed and is operatively connected to a sensing device for sensing vapors in said inlet, whereby the valve is opened when gasoline vapors are present in said inlet.

3. A process for recovering and disposing of gasoline vapor from vapor-laden air expelled from a tank while filling it with gasoline, comprising:
    A. collecting said vapors,
    B. measuring the volume of said vapors,
    C. passing at least some of said vapors through a bed of solid adsorbent capable of selectively adsorbing gasoline from the vapor-laden air,
    D. passing air substantially free of gasoline vapors from said bed of adsorbent to the atmosphere,
    E. stopping the flow of vapor-laden air through said bed before said adsorbent becomes saturated with gasoline,
    F. subsequently backwashing said bed with a backwash gas consisting essentially of air for a period long enough to desorb gasoline to regenerate said bed,
    G. passing the gasoline-containing backwash air to a furnace wherein the gasoline contained in said backwash air is burned, and
    H. extinguishing the furnace flame when said backwash air contains insufficient gasoline to support combustion.

4. A system as in claim 1 wherein flame sensing means are provided in the furnace and operatively connected to said control means for placing the system in the adsorbtion mode in the absence of a flame.

* * * * *